UNITED STATES PATENT OFFICE 2,585,682

ANTHRAQUINONE DYESTUFF FOR WOOL

David I. Randall, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,395

2 Claims. (Cl. 260—367)

This invention relates to a dyestuff of the anthraquinone series which dyes wool a greenish-blue shade.

We have discovered a new dyestuff of the formula:

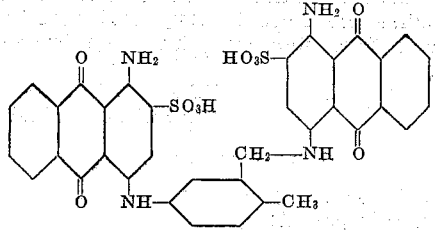

Dyeings produced by this product show excellent resistance to light and fulling tests and was found to be significantly better than the closest known dyestuff now on the market. The shade is a desirable greenish-blue.

In general the process for preparing the dyestuff comprises the reaction of "bromaminic acid" (1 - amino-4-bromoanthraquinone - 2 - sulfonic acid) and N-2-methyl-5-aminobenzylformamide followed by hydrolysis of the formyl group and subsequent reaction of the thus produced amino with more bromaminic acid.

The following example is a preferred process for producing the dyestuff but it will be understood that variations and substitutions may be made within the scope of the claims.

EXAMPLE (a) *Reaction of 1-amino-4-bromanthraquinone-2-sulfonic acid and N-(5-amino-2-methylbenzyl) formamide.*—In a suitable vessel equipped with a stirrer, condenser, heater and thermometer was placed 20.2 parts by weight sodium 1-amino-4-bromoanthraquinone-2-sulfonate, 11.5 parts N-(5-amino-methylbenzyl) formamide, 42.0 parts sodium bicarbonate, 1.0 part cuprous chloride and 600.0 parts water. The mixture was stirred at 75° C. for two hours, during which time it darkens rapidly to a deep blue; the temperature was raised to 85° C. for another hour more; after one more hour with the temperature at 95° C., the reaction was completed. The reaction was allowed to cool to 70° C., at which temperature it was filtered; the deeply colored but dull appearing filtrate was discarded. The cake was stirred briefly with 1500.0 parts water at 85° C. Then was added 55.0 parts sodium chloride, and the material which separated was isolated by filtration. The dissolution-salt precipitation operation was repeated using the same volume of water but smaller amounts of salt. (Thirty parts salt in the first repetition; twenty in the second and fifteen in the third.) The final cake was filtered, washed once with a small amount of cold water and dried. It weighed about 22 parts. This product was a dyestuff for wool yielding attractive bright greenish blue dyeings of good properties.

(b) *Hydrolysis.*—18.0 parts of the product of part (a) were refluxed for three hours with 200.0 parts hydrochloric acid (5% by weight). The product was filtered and washed well with 1000.0 parts hot water; the initial washings were somewhat colored, the final washings clear and nearly uncolored. The dried weight of the product is 14.5 parts. This product was of little use as a dyestuff for wool because of its insolubility. This behavior was probably a result of its internally compensated ionic structure; apparently little dissociation occurs in water. Evaporation of an ammoniacal suspension does not yield a substantially more soluble product.

(c) *Reaction of the product of part (b) with 1-amino - 4 - bromoanthraquinone - 2 - sulfonic acid.*—In a suitable vessel equipped with a stirrer, heater, condenser and thermometer were placed 6.6 parts product (b), 6.0 parts sodium 1-amino-4-bromoanthraquinone-2-sulfonate, 10.6 parts sodium carbonate, .5 part cuprous chloride and 100.0 parts water. The mixture was stirred at 80° C. for twelve hours. The mixture was allowed to cool. It was then filtered, the cake being washed with 15.0 parts sodium chloride (5%). The cake was dissolved in 450.0 parts hot water. Then was added 85.0 parts hydrochloric acid (10%); the precipitated material was isolated and redissolved in 90.0 parts hot water containing 6.5 parts sodium carbonate. The solution was filtered. To the warm filtrate was added 20.0 parts sodium chloride; the material which settled out was filtered off at 65° C. The cake was slurried with 90.0 parts water. Then was added 17.0 parts concentrated hydrochloric acid. The material which settled was collected by filtration and stirred with 50.0 parts concentrated ammonia and 50.0 parts water. The slurry was evaporated to dryness. The solid which was obtained was easily soluble in water. When applied to wool by the usual techniques, it yielded attractive greenish-blue dyeings; the neutral dyeings were strong. The dyeings show good fastness to light and excellent fastness to washing and fulling.

The reaction may be represented as follows:

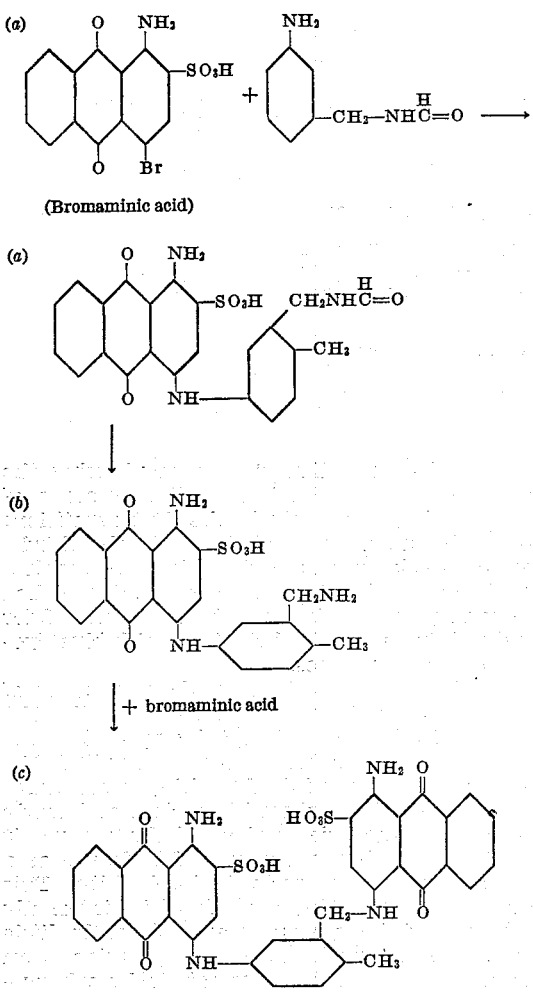

We claim:
1. A new dyestuff of the formula:

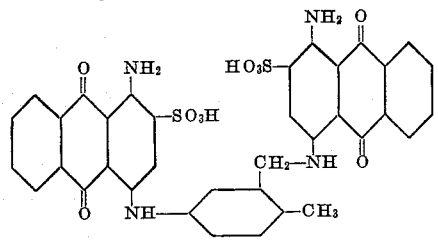

2. A process for preparing a new dyestuff of the formula:

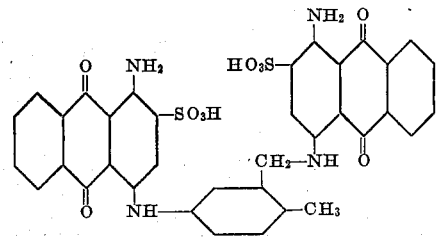

which comprises reacting bromaminic acid with N-(2-methyl-5-amino-benzyl)formamide, hydrolyzing the formyl group and reacting the product thus obtained with more bromaminic acid.

DAVID I. RANDALL.
EDGAR E. RENFREW.

REFERENCES CITED

The following references are of record in the file of this patent:

UNITED STATES PATENTS

| Number | Name | Date |
|---|---|---|
| 2,245,780 | Heinrich | June 17, 1941 |

FOREIGN PATENTS

| Number | Country | Date |
|---|---|---|
| 215,294 | Germany | July 1907 |
| 174,544 | Switzerland | Jan. 1935 |
| 183,899 | Switzerland | Apr. 1936 |